3,536,731
PRODUCTION OF PIVALOLACTONE
Johannes Radder, Pieter A. Gautier, and Jan P. Campen, Amsterdam, Netherlands, assignors to Shell Oil Company, New York, N.Y., a corporation of Delaware
No Drawing. Filed Oct. 30, 1967, Ser. No. 679,180
Claims priority, application Great Britain, Dec. 28, 1966, 57,927/66
Int. Cl. C07d 3/00
U.S. Cl. 260—343.9                                    9 Claims

ABSTRACT OF THE DISCLOSURE

Production of $\alpha,\alpha$-dimethyl-$\beta$-propiolactone (pivalolactone) by (a) adding to an aqueous solution of sodium $\alpha,\alpha$-dimethyl-$\beta$-chloropropionate, an additional amount of a sodium salt which is selected from the chloride, bromide, perchlorate and sulfate, (b) intimately contacting and thereby extracting $\alpha,\alpha$-dimethyl-$\beta$-propiolactone as it is formed from the resulting aqueous solution with a water-immiscible organic solvent, (c) recovering from the organic extract thus obtained $\alpha,\alpha$-dimethyl-$\beta$-propiolactone and (d) recycling a portion of the separated aqueous phase containing sodium salt for use in (a). Pivalolactone is particularly useful for conversion to polyesters.

BACKGROUND OF THE INVENTION

It is known that a $\beta$-lactone, for example an $\alpha,\alpha$-dialkyl-$\beta$-propiolactone, can be prepared by subjecting an aqueous solution of a salt of the corresponding $\beta$-halogencarboxylic acid to extraction with a water-immiscible organic solvent and recovering the lactone from the organic extract thus obtained (see, for example, "Organic Reactions," vol. VIII, pp. 308 et seq., John Wiley and Sons, Inc., New York, 1954). Taking the conversion of sodium $\alpha,\alpha$-dimethyl-$\beta$-chloropropionate as an example, the chemical reaction which takes place in the aqueous solution proceeds as follows:

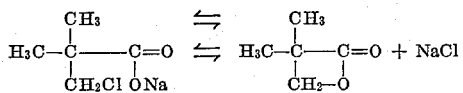

It will be apparent that in the conversion of metal-$\beta$-halogencarboxylates, the production of a certain amount of the desired $\beta$-lactone is always accompanied by the production of a corresponding amount of an inorganic salt being a metal halide.

Since the yield of the desired lactone may be adversely affected by the occurrence of several side reactions or consecutive reactions in the aqueous medium, including hydrolysis, decarboxylation, dimerization or polymerization of the lactone or the carboxylate ion, the transfer of the lactone from the aqueous medium to the organic solvent should proceed rapidly. This requires the application of an adequately effective extraction procedure, involving the use of large amounts of organic solvent for the extraction of a given amount of aqueous solution.

C. E. Lorenz in U.S. 3,291,810, issued Dec. 13, 1966, discloses a method wherein the lactone is transferred from the aqueous medium to an organic solvent rapidly by injecting a cool solution of neutralized $\alpha,\alpha$-dimethyl-$\beta$-chloropropionic acid into a highly vigorously agitated dispersion of aqueous phase and heated organic solvent under pressure sufficient to prevent boiling of the solvent and separating the resulting solution of lactone in the organic solvent from the aqueous phase.

It would be advantageous to have a method wherein the extraction of the aqueous solution with the organic solvent proceeded under considerably less stringent conditions and utilizing lesser amounts of organic solvent, while nevertheless maintaining attractively high yields of the desired lactone.

SUMMARY OF THE INVENTION

The above advantage is obtained in the process of the invention by including one or more additional inorganic salts or an additional amount of the same inorganic salt which is formed during the neutralization of $\alpha,\alpha$-dimethyl-$\beta$-chloropropionic acid in the aqueous solution to be or being extracted. Accordingly, the present invention provides a process for the production of $\alpha,\alpha$-dimethyl-$\beta$-propiolactone (pivalolactone) by (a) adding to an aqueous solution of sodium $\alpha,\alpha$-dimethyl-$\beta$-chloropropionate, an additional amount of a sodium salt selected from the chloride, bromide, perchlorate and sulfate, (b) intimately contacting and thereby extracting $\alpha,\alpha$-dimethyl-$\beta$-propiolactone as it is formed from the resulting aqueous solution with a water-immiscible organic solvent, (c) recovering from the organic extract thus obtained $\alpha,\alpha$-dimethyl-$\beta$-propiolactone and (d) recycling a portion of the separated aqueous phase containing sodium salt for use in (a). Since $\beta$-lactones are known to react with soluble inorganic salts, i.e., the reaction leading to $\beta$-lactones is reversible, and since certain inorganic salts promote the polymerization of lactones, it is surprising that the use of the additional inorganic sodium salts raises the yield herein while diminishing the amount of solvent required.

DESCRIPTION OF PREFERRED EMBODIMENTS

The sodium salt of $\alpha,\alpha$-dimethyl-$\beta$-chloropropionic acid which is converted herein to $\alpha,\alpha$-dimethyl-$\beta$-propiolactone is derived from bases which are strong enough to neutralize the $\beta$-chloropropionic acid in water. Bases which satisfy this requirement are, for example, sodium hydroxide, sodium bicarbonate, and the like. The amounts of the sodium salt of the $\beta$-chloropropionic acid in the aqueous solutions to be extracted generally vary from about 3 to about 50 percent by weight; concentrations between about 10 and about 40 percent by weight are especially preferred. The solutions may be prepared either by dissolving ready-made salts in water or by neutralizing the $\alpha,\alpha$-dimethyl-$\beta$-chloropropionic acid in water with dilute aqueous solutions of one of the above-mentioned bases. In this context the term "neutralizing" should not, however, be interpreted in its limitative sense to cover merely the change of pH to the neutral pH-value of 7.0, but taken to comprise any change of pH to a value between 5.0 and 10.5.

Such preparations of the aqueous solutions of the sodium salt of $\alpha,\alpha$-dimethyl-$\beta$-chloropropionic acid may be carried out either before or simultaneously with the extraction of the solutions with the organic solvent. The temperature at which these preparations take place is not of essential interest. It is possible to adopt temperatures which are equal to the extraction temperature, but higher or lower temperatures are also feasibly permitted on the understanding that, depending on the temperature level, if the preparation is not conducted simultaneously with the extraction of the aqueous salt solutions, the time elapsing between the moment of preparation and the contact with the extractant is to be controlled closely, in order to prevent the occurrence of yield losses owing to side reactions or consecutive reactions in the aqueous solutions as much as possible. The allowable time margin is, however, considerably wider if the temperature of the aqueous salt solutions is maintained at a value below 15° C., preferably between +10 and −10° C. In these cases the drawbacks attaching to a close check of the brief space of time permissible at higher temperatures will no longer apply.

In accordance with the present invention to the aqueous solutions is added additional quantity of one or more inorganic salts. Suitable salts are in principle all neutral inorganic salts which are readily soluble in water, i.e., salts of which the solubility in water is at least 30 grams per liter. The term "neutral" is used herein to define those salts which, upon dissolution in water having a pH of 7.0, form aqueous solutions with a pH between 5.0 and 10.5. Especially useful salts are the chloride, bromide, perchlorate or sulfate of sodium, preferably sodium chloride. Another preferred salt is sodium sulfate. The amounts of these inorganic salts in the aqueous solutions used in the process of this invention are as a rule selected to be between about 0.3 and about 9, preferably between about 0.7 and about 5.5 moles per liter of water.

Incorporation of the inorganic salts into the aqueous solutions to be extracted is possible either before, during or after the preparation of the aqueous solutions of the sodium salt of $\alpha,\alpha$-dimethyl-$\beta$-chloropropionic acid. As in the case of the latter salt, the inorganic salts can be incorporated into water by either dissolving ready-made salts or by preparing these salts in situ, for example by neutralizing acids with bases in the presence of water. Thus an aqueous solution of sodium chloride and the sodium salt of $\alpha,\alpha$-dimethyl-$\beta$-chloropropionic acid can be prepared by neutralizing a dilute aqueous solution of sodium hydroxide with appropriate amounts of hydrogen chloride and $\alpha,\alpha$-dimethylpropionic acid.

In most cases the inorganic salts will be added to the solutions of the $\alpha,\alpha$-dimethyl-$\beta$-chloropropionate before the latter are subjected to the extraction with the organic solvents. However, the process of the invention is not limited thereto; it is also possible to dissolve the inorganic salts into the aqueous solutions during the extraction thereof, i.e. after the extraction has been started and a part of the sodium carboxylate employed has already been converted into the desired $\beta$-lactone.

A useful embodiment of the process of this invention comprises the use of inorganic salt which is the same as the inorganic salt formed by the conversion of the sodium carboxylate, i.e., the use of sodium chloride in the conversion of the sodium salt of $\alpha,\alpha$-dimethyl-$\beta$-chloropropionic acid. To fulfill the requirements of this invention, these added specific inorganic sodium salts should be present in the aqueous solutions during at least a part of their extraction with organic solvent in total amounts which are greater than the amounts of inorgnaic salt formed by the conversion of the $\alpha,\alpha$-dimethyl-$\beta$-chloropropionic acid salt. Preferably, these total amounts are at least twice the amounts of salt formed by the said conversion reaction.

Organic solvents which are conveniently used in the extraction of the aqueous solutions are, in principle, all organic liquids in which the $\beta$-lactone is readily soluble, which are not miscible with water and which are, moreover, chemically inert toward the components which play a role in the reaction. Examples of useful solvents are halogenated hydrocarbons, such as tri- or tetrachloromethane, 1,1- or 1,2-dichloroethane, di-, tri- or tetrachloroethylene, aromatic hydrocarbons, such as benzene, toluene, nitrobenzene or nitrotoluene, and aliphatic ethers, such as isopropyl ether or halogenated aliphatic ethers. Aliphatic hydrocarbons, such as hexane, heptane and isooctane, are also useful, but less preferable. Largely because of economic reasons, benzene is a particularly preferred solvent.

The extraction is carried out either batchwise or continuously, and either of these embodiments may be combined with batchwise or continuous conversions of the $\alpha,\alpha$-dimethyl-$\beta$-chloropropionic acid salt into the desired $\beta$-lactone. Moreover, in batchwise conversion a distinction can be made between continuous addition of the aqueuos salt solution to the extraction phase of the process, until the desired overall amount of salt solution has been obtained, and discontinuous addition of one or more separate portions. A continuous extraction is preferably conducted according to the countercurrent principle, although good results are also obtained with continuous extraction in co-current flow. The embodiment of the process of this invention combining continuous extraction with continuous conversion is especially preferred.

Furthermore, complete continuous embodiments of the present process are possible with use of the principle of steady state, which comprises application of one or more reaction-extraction zones connected in series or in parallel, to which the various components of the reaction medium are continuously supplied and from which a part of the reaction mixture is continuously withdrawn, so that the composition of the medium in each of the various zones remains constant throughout, while this composition is, moreover, kept homogeneous by vigorous mechanical agitation in each zone. Also, a complete continuous embodiment with extraction in countercurrent or in co-current may be conducted in one or more tubular reaction-extraction zones, in which the aqueous solution and/or the organic solvent are introduced either at the top or bottom of the tubular reactor, or at various points scattered down the length of the tube.

The extraction of the aqueous solutions should proceed with sufficient efficacy to give attractive yields. In general, this requirement is satisfied when care is taken that the concentration of the $\beta$-lactone in the organic extracts obtained is maintained below a value of 15 percent by weight. The extraction conditions which lead to these maximum concentrations can easily be established by means of a simple analysis of the solution withdrawn, for instance with the aid of gas-liquid chromatographic analysis. If such an analysis indicates too high a concentration, the amount of organic solvent used per unit time during the extraction must be increased to such an extent that the product concentration drops to the required maximum.

In the extraction the most advantageous results are usually obtained when the concentrations of the lactone in the organic extracts obtained have a value between about 3 and about 10 percent by weight. The volume ratios of the aqueous and the organic solutions employed in the extraction in the process of this invention may, in general, be suitably varied within the limits of about 0.3:1 to about 3:1. It is preferred to mix the two solutions intimately, for instance by vigorous stirring, in order to make the extraction proceed as effectively as practicable.

As a rule, the temperature at which the extraction takes place is maintained between about 40° and about 85° C. However, temperatures between about 45° and about 65° C. are especially preferred.

All temperatures here discussed may be either kept constant or raised continuously or at periodic intervals during the course of the chemical reaction. The latter two possibilities are recommended especially in those cases where the conversion of the $\alpha,\alpha$-dimethyl-$\beta$-chloropropionate into the desired lactone takes place batchwise, whether or not with continuous extraction.

After the exraction any amounts of aqueuos salt solution which may have been entrained with the organic extracts may be removed by one or more conventional phase separations. If desired, the organic solutions are dried still further by the addition of conventional inorganic water-absorbent materials. The lactone is then recovered by any method known per se from the organic solution ultimately obtained, for instance by distilling the lactone or the solvent off. This distillation may be carried out in one or more stages. After the separation of the lactone, the organic solvent may be recirculated and used again for the extraction of aqueous solutions as described hereinbefore.

Likewise, the aqueous solution which has been extracted may be recirculated entirely or partly to the aqueous solution to be or being extracted. This embodiment is particularly preferred when both the extraction and the conversion of the sodium salt of α,α-dimethyl-β-chloropropionic acid into the desired β-lactone are effected continuously. The latter embodiment of the process of this invention has the specific advantage that the preparation of the β-lactone may proceed without substantially, or even without any, consumption of inorganic salt. The following illustrates this advantageous embodiment:

An aqueous solution containing 2 moles/liter (moles/l.) of sodium chloride and 1 mole/l. of sodium α,α-dimethyl-β-chloropropionate is continuously fed at a constant rate of 100 liters/hr. (l./h.) to the bottom of a continuously and countercurrently operated rotating disc contactor. The residence times of the aqueous solution and of the organic solvent in the contactor are selected such that during the passage of the aqueous solution through the contactor the carboxylic acid salt is completely converted into α,α-dimethyl-β-propiolactone (pivalolactone) and that all the lactone (7 l./h.) formed is transferred from the aqueous phase to the organic solvent. Thus, the aqueous solution which is withdrawn from the top of the contactor at a rate of 93 l./h. contains 3.2 moles/l. of sodium chloride and no carboxylic acid salt or β-lactone. Thus, the process is readily operated producing this stream containing less than 2% carboxylic acid salt and β-lactone. This stream of aqueous solution is now divided into two parts: one part is removed from the production system at a constant rate of 31 l./h., the remaining part (62 l./h.) is mixed with a 2.9 moles/l. sodium hydroxide solution which is continuously fed at a rate of 31 l./h. to the sodium chloride solution, thereby supplying both sodium hydroxide and make-up water to replace that withdrawn. Next, molten α,α-dimethyl-β-chloropropionic acid is pumped into the alkaline sodium chloride solution at a constant rate of 100 moles/h. to form the aqueous solution containing 1 mole/l. of sodium α,α-dimethyl-β-chloropropionate and 2 moles/l. of sodium chloride which is introduced into the bottom of the rotating disc contactor at a constant rate of 100 l./h. It will be clear that by keeping all the conditions described continuously constant, the production unit is operated without any sodium chloride being consumed. Even the starting-up of such a production unit may be effected without any consumption of sodium chloride. In this case one can start the production by introducing an aqueous solution merely containing sodium α,α-dimethyl-β-chloropropionate into the contactor, whereupon the conditions for the recirculation of the aqueous solution withdrawn from the contactor are adjusted in such a way that the concentration of sodium chloride in the aqueous solutions being extracted is gradually built up to the required value.

Additionally, it will be clear that variations and modifications of the hereinabove illustration are possible without detracting from the essential principle thereof, namely, providing salts other than sodium chloride, e.g., sodium sulfate, to the recycle aqueous solution stream, particularly in an amount to make up for such salt, i.e., sodium sulfate, withdrawn or discarded in the continuous division or splitting of the stream, analogous to supplying make-up water to replace that withdrawn so as to maintain the balance.

The process of this invention provides an improved method for producing pivalolactone which is particularly useful for conversion to polyesters by polymerization processes known in the art.

EXAMPLE I

One liter of a dilute aqueous alkali hydroxide solution having a temperature of 45° C. was placed in a one-necked round-bottom flask. The flask was provided with a mechanical stirrer and the neck with a number of settler rings, so that this neck acted as a phase separator in the extraction to be described hereinafter. The solution, wherein the molar concentration of sodium hydroxide was 1 mole/l., was neutralized to a pH of 7.0 by the addition of α,α-dimethyl-β-chloropropionic acid with vigorous stirring. Immediately thereafter the flask was completely filled by the introduction of benzene, at the bottom. The addition of benzene was continued for 5.5 hours at the constant rates indicated in Table I, below, while the stirring and the temperature of 45° C. were maintained throughout. The organic extract flowing from the top of the phase separator was continuously collected in a storage vessel, in which 1 g. of picric acid was present in order to prevent premature polymerization of the α,α-dimethyl-β-propiolactone formed. At the end of each experiment the lactone was removed from the benzene extract by distillation to determine the yield. The results are given in Table I as molar percentages, calculated on the amount of α,α-dimethyl-β-chloropropionic acid added.

These experiments which are included for the purpose of comparison only were repeated to illustrate the process of the invention under identical conditions, except that the aqueous solution now contained not only sodium-α,α-dimethyl-β-chloropropionate, but also sodium sulfate at a concentration of 1 mole/l., or sodium chloride, sodium bromide and sodium perchlorate, respectively, at a concentration of 2 moles/l.

TABLE I

| Rate of benzene addition, l/h. | Yields, percent m. | | | |
| --- | --- | --- | --- | --- |
| | 0.5 | 1 | 3.4 | 7 |
| Aqueous phase containing sodium carboxylate | 67 | 70 | 83 | 86 |
| Aqueous phase containing sodium carboxylate plus Na$_2$SO$_4$ | 76 | 83 | 85 | 86 |
| Aqueous phase containing sodium carboxylate plus NaCl | 74 | 81 | 84 | 86 |
| Aqueous phase containing sodium carboxylate plus NaBr | 73 | 80 | 85 | 86 |
| Aqueous phase containing sodium carboxylate plus NaClO$_4$ | 73 | 80 | 84 | 86 |

The results in Table I show improved yield of lactone by addition of the inorganic salts while using less of the solvent, i.e., 0.5, 1 and 3.4 l./h. of solvent as compared with 7 l./h.

EXAMPLE II

The procedure followed in Example I was repeated under identical conditions except that the reaction temperature was 65° C. and the reaction time was 20 minutes. The rates of benzene addition and the results obtained in these runs are shown in Table II.

TABLE II

| Rate of benzene addition l./h. | Yields, percent m. | | |
| --- | --- | --- | --- |
| | 5.5 | 9 | 15 |
| Aqueous phase containing sodium carboxylate | 70 | 82 | 85 |
| Aqueous phase containing sodium carboxylate plus Na$_2$SO$_4$ | 83 | 85 | 85 |
| Aqueous phase containing sodium carboxylate plus NaCl | 80 | 85 | 85 |

EXAMPLE III

In a continuously and countercurrently operated rotating disc contactor an aqueous solution containing 1.5 moles/l. of sodium α,α-dimethyl-β-chloropropionate was extracted with 1,2-dichloroethane at a temperature of 65° C. The α,α-dimethyl-β-propiolactone formed was removed from the extract by continuous distillation with continuous recirculation of 1,2-dichloroethane to the contactor. The rate of passing the aqueous solution through the contactor was adjusted to give a conversion of carboxylic acid salt of more than 90%. Thereafter, while, leaving this rate constant, the rate at which the organic solvent was passed through the contactor was varied in order to find the rate giving the highest possible lactone yield.

This extraction run was now repeated with inclusion of 2 mole/l. of sodium sulfate into the aqueous solution to be extracted. As in the comparative example, run without the addition of sodium sulfate, at a constant conversion being identical with that given hereinbefore, the rate at which the organic solvent was passed through the contactor was varied in order to find the rate giving the highest possible lactone yield. It was found that the latter rate was more 30% lower than the corresponding value given in the comparative example run without the addition of soduim sulfate.

Just as the preceeding examples of batchwise conversion, the present example describing continuous conversion of carboxylic acid salt into the β-lactone illustrates quite clearly that the process of this invention makes it possible to obtain attractively high yields of β-lactone while operating the prescribed extraction at extraction rates which may be appreciably lower than those required in the prior art processes, which do not involve the presence of additional inorganic acid salts in the aqueous carboxylic acid salt being extracted.

We claim as our invention:

1. In a continuous process of forming and extracting pivalolactone from an aqueous solution of sodium $\alpha,\alpha$-dimethyl-$\beta$-chloropropionate by intimately contacting the aqueous solution in an extraction zone with a water-immiscible solvent for pivalolactone, separating the resulting solvent extract and lean aqueous phases, recovering the pivalolactone from the solvent extract and recycling the solvent to the extraction zone, the improvement comprising recycling a portion of the separated aqueous phase containing sodium chloride, resulting from the lactonization of the sodium $\alpha,\alpha$-dimethyl-$\beta$-chloropropionate, to the extraction zone while adding sodium hydroxide and a stoichiometric amount of $\alpha,\alpha$-dimethyl-$\beta$-chloropropionic acid, in relative amount such that the molar amount of the sodium chloride in the aqueous recycle portion is at least equal to the molar amount of $\alpha,\alpha$-dimethyl-$\beta$-chloropropionic acid and while adding make-up water in an amount corresponding to that withdrawn from the separated aqueous phase in providing the recycle portion.

2. The process of claim 1 wherein the separated aqueous phase, which provides the recycle portion, is essentially free of sodium $\alpha,\alpha$-dimethyl - $\beta$ - chloropropionate and pivalolactone.

3. The process of claim 1 wherein the extraction is carried out at a temperature between about 40° and about 85° C.

4. The process of claim 3 wherein sodium sulfate is added to the recycle portion of the separated aqueous phase containing sodium chloride.

5. The process of claim 1 wherein the volume ratio of aqueous solution to water-immiscible solvent for pivalolactone in the extraction zone is in the range from about 0.3:1 to about 3:1.

6. The process of claim 5 wherein the water-immiscible solvent for pivalolactone is benzene.

7. The process of claim 5 wherein the water-immiscible solvent for pivalolactone is 1,2-dichloroethane.

8. The process of claim 1 wherein in the lactonization step sodium salts are present in the aqueous solution in an amount between about 0.3 and about 9 moles per liter of water.

9. The process of claim 1 wherein the aqueous solution to be extracted contains from about 10 to about 40 percent by weight of sodium $\alpha,\alpha$-dimethyl-$\beta$-chloropropionate.

References Cited

UNITED STATES PATENTS 2,759,003  8/1956  Jansen et al. _____ 260—393.9

FOREIGN PATENTS 1,122,939  8/1968  Great Britain.

OTHER REFERENCES

Weissberger, Separation and Purification, part I, vol. III, 1956, pp. 199–392.

ALEX MAZEL, Primary Examiner

A. M. T. TIGHE, Assistant Examiner